United States Patent
Flynn (12)

(10) Patent No.: US 10,627,040 B1
(45) Date of Patent: Apr. 21, 2020

(54) FLEXIBLE STANDOFF FOR INSTALLATION OF PIPE INSULATION

(71) Applicant: Michael S. Flynn, Oxford, CT (US)

(72) Inventor: Michael S. Flynn, Oxford, CT (US)

( * ) Notice: Subject to any disclaimer, the term of this patent is extended or adjusted under 35 U.S.C. 154(b) by 0 days.

(21) Appl. No.: 16/411,715

(22) Filed: May 14, 2019

(51) Int. Cl.
  *F16L 3/00* (2006.01)
  *F16L 59/13* (2006.01)

(52) U.S. Cl.
  CPC ................................. *F16L 59/13* (2013.01)

(58) Field of Classification Search
  CPC ....................................................... F16L 59/13
  USPC .............. 248/58, 62, 65, 74.2; 138/106, 107
  See application file for complete search history.

(56) References Cited

U.S. PATENT DOCUMENTS

| | | | |
|---|---|---|---|
| 5,848,770 A * | 12/1998 | Oliver ..................... | E21F 17/02 248/58 |
| 7,284,728 B2 * | 10/2007 | Connolly ................. | F16L 3/11 248/62 |
| 7,677,505 B2 * | 3/2010 | Deichman ............. | F16L 3/1008 138/106 |
| 9,903,524 B2 * | 2/2018 | Lange .................... | F16L 59/135 |
| 10,295,086 B2 * | 5/2019 | Juzak .................... | F16L 3/1075 |

* cited by examiner

*Primary Examiner* — Todd M Epps
(74) *Attorney, Agent, or Firm* — Leason Ellis LLP

(57) ABSTRACT

A device for providing a temporary space between and a pipe and a pipe support comprises a standoff having a plurality of blocks, with each block having a top and a bottom surface spaced from each other by sides, and a plurality of flexible connectors interconnecting the blocks. At least one flexible connector extends between adjacent blocks. The standoff defines a height such that in a first condition, in which the standoff is disposed between the pipe and the pipe support, the standoff defines a space and the flexible connectors flex with the standoff extending along at least a part of a circumference and the pipe. The insulation can be disposed in the space between the pipe and the pipe support in a second condition in which the standoff is removed from between the pipe and the pipe support. A method is also disclosed.

5 Claims, 2 Drawing Sheets

FLEXIBLE STANDOFF FOR INSTALLATION OF PIPE INSULATION

FIELD OF THE INVENTION

The present invention provides for a temporary pipe standoff support and, in particular, a temporary pipe standoff for installing pipe insulation.

BACKGROUND OF THE INVENTION

During building construction and/or remodeling, various pipes are installed in the building. These pipes can be used for various purposes such as cold water supply, hot water supply, drainage (e.g., wastewater drainage), venting, HVAC, refrigeration lines, etc. Many of these pipes, especially cold water/refrigerated water pipes, require insulation to be installed around the pipes, for example, to prevent the formation of condensation on the pipes.

The typical installation process involves the installation of the pipes, usually done by one contractor/trade that specialized in pipe installation. After the pipes are installed, the pipes are insulated at a later time, typically by a different contractor/trade. The fact that the pipes are installed first can create problems during the post-installation insulation process. One issue is attendant with the pipe supports that are typically installed to support the weight of the pipes. The pipe supports ordinarily hang from the ceiling of the building and include hanger support rods and a horizontal curved member that is in direct contact with the pipe. The horizontal curved member is in direct contact with the pipe to take the load of the pipe and transfer it to the building structure through the hanger support rods.

With the horizontal support member in direct contact with the pipe, there is no room between the pipe and the horizontal support member to provide insulation around the pipe. Accordingly, installing insulation around the pipes is rendered more difficult and time consuming. The process can involve various combinations of trying to lower the horizontal support member, bending the supports and/or shifting the pipe, and/or completely replacing supports with new support that are correctly positioned to accommodate the thickness of the insulation. This can greatly increase the time and difficulty associated with applying insulation to the pipes.

The present invention, as described herein, addresses these and other issues.

SUMMARY OF THE INVENTION

According to a first aspect of the invention, a device for providing a temporary space between and a pipe and a pipe support is provided. The device comprises a standoff having a plurality of blocks, with each block having a top and a bottom surface spaced from each other by sides, and a plurality of flexible connectors interconnecting the blocks. At least one flexible connector extends between adjacent blocks. The standoff defines a height such that in a first condition, in which the standoff is disposed between the pipe and the pipe support, the standoff defines a space and the flexible connectors flex with the standoff extending along at least a part of a circumference and the pipe. The insulation can be disposed in the space between the pipe and the pipe support in a second condition in which the standoff is removed from between the pipe and the pipe support.

In accordance with a further aspect of the invention, the device can include at least three blocks. Alternatively or in addition, the device can include at least three flexible connectors that extend between adjacent blocks.

In accordance with a still further aspect of the invention, a method is disclosed for providing a temporary space between a pipe and a pipe support to provide insulation about the pipe. The method comprises the steps of installing a standoff between the pipe support and the pipe, the standoff having a plurality of blocks, each block having a top and a bottom surface spaced by sides. The pipe support is fixed at a position in which the pipe is supported with the standoff disposed between the pipe and the pipe support. The standoff is removed from between the pipe and the pipe support after the position of the pipe support is fixed. An insulation is applied about the pipe such that at least a portion of the insulation extends between the pipe and the pipe support.

In accordance with a further aspect of the foregoing method, the position of the pipe support can be adjusted after installation of the insulation.

These and other features, aspects and details can be appreciated from the accompanying description of certain embodiments of the invention.

DETAILED DESCRIPTION CERTAIN OF EMBODIMENTS OF THE INVENTION

Figure 1:
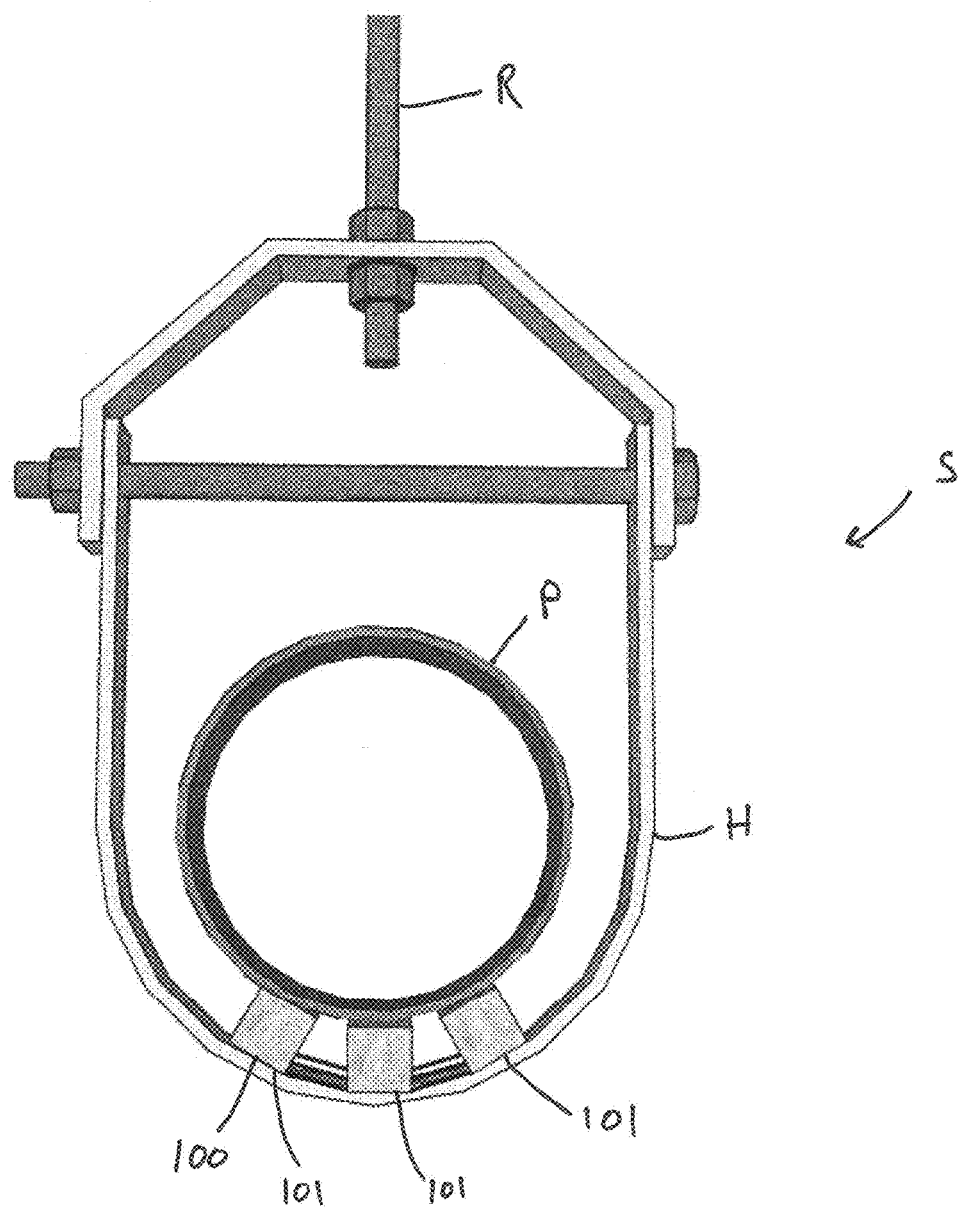
FIG. 1 shows a temporary standoff in accordance with one embodiment of the present invention disposed between a pipe and a pipe support.
Figure 2:
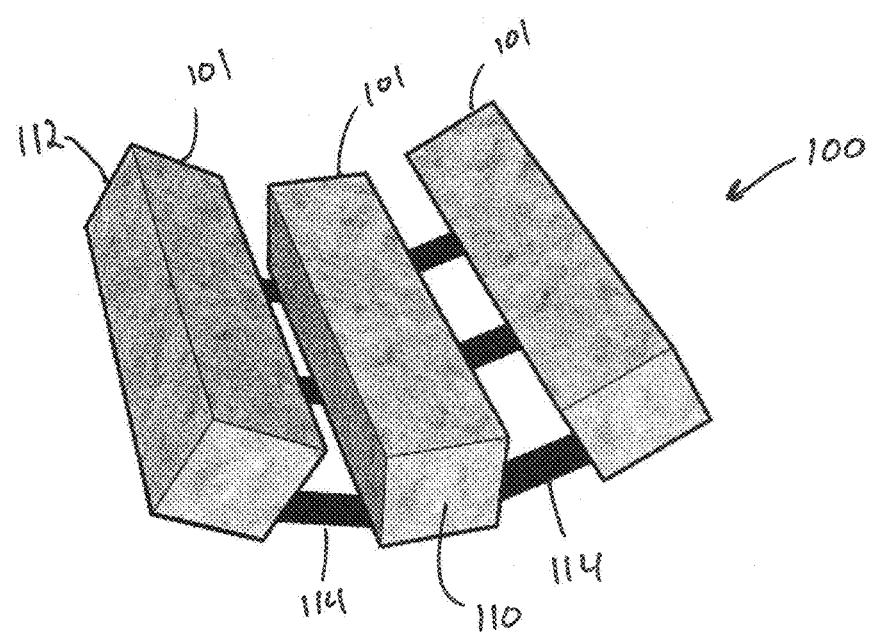
FIG. 2 is an isometric view of the temporary standoff of FIG. 1.
Figure 3:
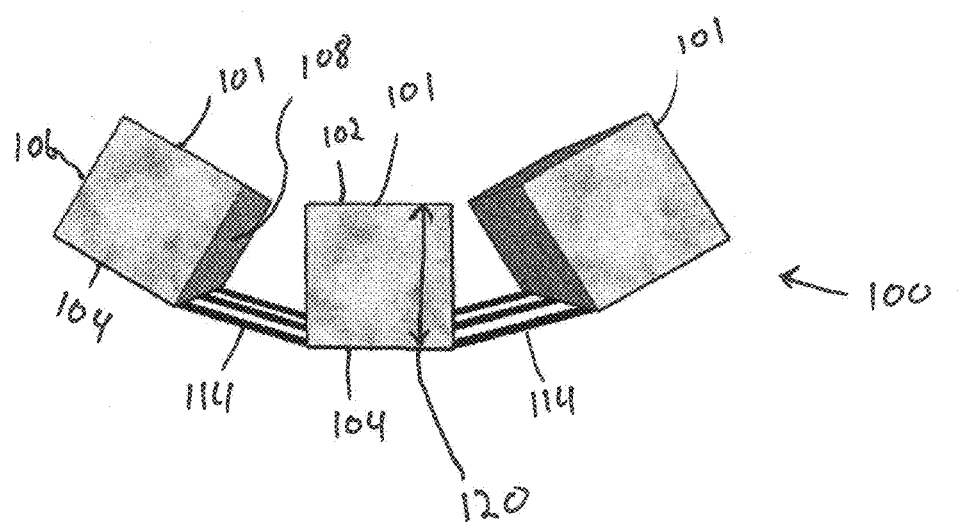
FIG. 3 is a front view of the temporary standoff of FIG. 1.

Referring to FIGS. 1-3, a temporary standoff 100 is shown. The temporary standoff 100 is configured for placement between a pipe P and a pipe support S. The pipe support S includes a hanger rod R and a horizontal curved member H. The standoff 100 has a plurality of blocks 101. Each block 101 has a top surface 102, a bottom surface 104, first and second sides 106, 108, a front surface 110, and a rear surface 112.

The blocks 101 are spaced from each other. In the illustrated embodiment, the blocks are connected by flexible connectors 114. The flexible connectors, when provided, can be relatively thin pieces of plastic, metal, or other suitable material. The connectors 114 permit the interconnected blocks to assume a curved profile by bending with respect to each other, and facilitate installation of a set of blocks in one motion. The curved profile shape assumed by flexing of the connectors can have a radius that approximates the radius of the pipe P. As such, when the pipe P rests on the standoff 100, the pipe P can be seated on the blocks 101, which at least partially wrap about the pipe. With the standoff 100 assuming a shape that corresponds to the pipe P, the weight of the pipe P can be distributed over a larger surface area (as opposed to a round pipe resting on a flat-shaped surface). The blocks 101 and connectors 114 can also have a shape designed to accommodate a range of pipe sizes (e.g., 6 inch to 8 inch pipes). Accordingly, standoffs 100 of different sizes and profiles can be provided to accommodate various pipe sizes.

In other embodiments, the blocks can be individual units not connected by connectors 114. The connectors are desirable to ease installation of the temporary standoff. However, the blocks can include an adhesive, for example, to enable temporarily securement of one block after another to suit the particular application.

The distance between the top surface 102 and the bottom surface 104 of the blocks 101 defines a standoff height 120. The standoff 100 can have a standoff height 120 sufficient to accommodate the thickness of insulation that will be applied to the pipe. As one non-limiting example, if the pipe P is to be wrapped with one inch thick insulation, the standoff 100 have can a standoff height 120 of approximately one inch. As such, when the temporary standoff 100 is removed from between the pipe P and the horizontal member H, there is sufficient space between the pipe P and the horizontal curved member H to wrap insulation about the pipe. The standoff height 120 can also be made larger or smaller than the insulation thickness. For example, the standoff height 120 can be made slightly larger than the insulation thickness so that the insulation can be installed more easily (after which the pipe support S can be adjusted to contact the insulation and the pipe to support the load of the pipe). The standoff height 120 can be made slightly less than the insulation thickness so that while the insulation may have to be compressed to be installed around the pipe P between the pipe P and the horizontal member H, the pipe support S may be able to better support the load of the pipe P without having to adjust the pipe support S during installation of the insulation. Preferably, the use of the standoff 100 eliminates the need to adjust the pipe support S.

The standoffs 100 can be supplied as part of a kit, for example. The kit can be job specific in which the number of standoffs provided equals to the number of pipe supports required for the pipe installation job. The standoffs can be preselected based on the diameter of the pipe and thickness of the insulation that will be provided such that the depression substantially corresponds to the diameter of the pipe and the standoff height 120 substantially corresponds to the thickness of the insulation that will be applied to the pipe. By "substantially corresponds," in this context, it is meant that the height is equal to or exceeds the thickness of the insulation by a small amount, such as 2% or less such that the insulation can occupy the place the standoffs 100 within the hanger once the insulation is in place. As another example, a kit can be provided in which a variety of standoffs are provided which have various combinations of depression profiles and standoff heights. A worker can then select the proper standoff from the kit suitable for the diameter of the pipe and the thickness of the insulation that is to be applied.

The standoffs 100 can be made from various materials such as metal, plastic, wood, or other suitable materials. The standoffs can be made relatively inexpensively, especially if cheap materials such as plastic or wood are used. As such, the standoffs can be designed to be single use devices. The standoffs can also be reused for multiple installations, if desired.

As one illustration of an exemplary use of the standoff 100, the pipe P is positioned in place (e.g., within the building under construction) and the support rod R of the pipe support S is attached to the surrounding structure. The horizontal curved member H is placed underneath the pipe P with the support rod R supporting the horizontal curved member H. The temporary standoff 100 is disposed between the pipe P and the horizontal member H. The horizontal member H can be raised underneath the pipe P until the pipe P is contacted by the standoff 100 with the flexible connections 114 flexing such that the blocks 101 at least partially surround the pipe P. Once the horizontal member H is in position such that the pipe is supported by the temporary standoff 100, the horizontal member H can be fixed to the support rod R (e.g., with nuts attached to threaded ends of the support rods). As such, the pipe P is supported and spaced via the temporary standoff 100 until insulation can be installed about the pipe. During the insulation installation process, the temporary standoff 100 is removed from between the pipe P and the horizontal member H and insulation is provided about the pipe P with a portion of the insulation being disposed between the pipe P and the horizontal member H in a space that was previously occupied by the temporary standoff 100. Once the insulation is installed, final adjustments can be made to the pipe support S, if necessary, so that the horizontal member is supporting the weight of the pipe P now that the standoff 100 has been removed and the insulation installed. However, it is preferable that use of the standoff eliminates the need to adjust the pipe support or horizontal member, which significantly improves the efficiency and cost effectiveness of insulation installation.

As can be seen from the forgoing, the present invention provides an improved device and method for installing pipes which require application of insulation. The standoff provides a means for supporting the pipe during the pipe installation process.

Notably, the figures and examples above are not meant to limit the scope of the present application to a single implementation, as other implementations are possible by way of interchange of some or all of the described or illustrated elements. Moreover, where certain elements of the present application can be partially or fully implemented using known components, only those portions of such known components that are necessary for an understanding of the present application are described, and detailed descriptions of other portions of such known components are omitted so as not to obscure the application. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present application encompasses present and future known equivalents to the known components referred to herein by way of illustration.

The foregoing description of the specific implementations will so fully reveal the general nature of the application that others can, by applying knowledge within the skill of the relevant art(s) (including the contents of the documents cited and incorporated by reference herein), readily modify and/or adapt for various applications such specific implementations, without undue experimentation, without departing from the general concept of the present application. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings are shown accordingly to one example and other dimensions can be used without departing from the invention.

While various implementations of the present application have been described above, it should be understood that they have been presented by way of example, and not limitation. It would be apparent to one skilled in the relevant art(s) that various changes in form and detail could be made therein without departing from the spirit and scope of the application. Thus, the present application and invention disclosure should not be limited by any of the above-described example implementations, but rather is defined by the claims that follow and equivalents of the features recited therein.

I claim:

1. A device for providing a temporary space between and a pipe and a pipe support, comprising:
    a standoff having a plurality of blocks, each block having a top and a bottom surface spaced from each other by sides; and
    a plurality of flexible connectors interconnected between adjacent ones of the plurality of blocks; and
    wherein the standoff defines a standoff height between the top surface and the bottom surface of at least one of the plurality of blocks such that in a first condition in which the standoff is disposed between the pipe and the pipe support the standoff defines a space and the flexible connectors are flexed such that the standoff extends along at least a part of a circumference and the pipe,
    wherein insulation can be disposed in the space between the pipe and the pipe support in a second condition in which the standoff is removed from between the pipe and the pipe support.

2. The device according to claim 1, wherein the plurality of blocks includes at least three blocks and wherein the standoff height is between top surface and the bottom surface of the at least three blocks.

3. The device according to claim 1, wherein plurality of flexible connectors comprise at least three flexible connectors interconnected between adjacent ones of the plurality of blocks.

4. A method for providing a temporary space between a pipe and a pipe support to provide insulation about the pipe, the method comprising the steps of:
    installing a standoff between the pipe support and the pipe, the standoff having a plurality of blocks, each block having a top and a bottom surface spaced by sides;
    fixing the pipe support at a position in which the pipe is supported with the standoff disposed between the pipe and the pipe support;
    removing the standoff from between the pipe and the pipe support after the position of the pipe support is fixed; and
    applying insulation about the pipe such that at least a portion of the insulation extends between the pipe and the pipe support.

5. The method of claim 4, further including the step of adjusting the position of the pipe support after installation of the insulation.

* * * * *